United States Patent

Vellucci, Jr. et al.

[11] Patent Number: 5,484,616
[45] Date of Patent: Jan. 16, 1996

[54] PROCESS FOR PREPARING SHELF-STABLE, INTERMEDIATE-MOISTURE POTATOES

[75] Inventors: Dominic J. Vellucci, Jr.; Charles R. Mason, both of Yonkers; Stuart A. Cochran, Tarrytown, all of N.Y.; Edward C. Coleman, New Fairfield, Conn.; Dalip K. Nayyar, Washingtonville, N.Y.

[73] Assignee: Kraft Foods, Inc., Northfield, Ill.

[21] Appl. No.: 376,592

[22] Filed: Jan. 20, 1995

[51] Int. Cl.⁶ .............................. A23L 1/216; A23L 1/217
[52] U.S. Cl. .................... 426/242; 426/321; 426/637
[58] Field of Search .................................. 426/637, 241, 426/242, 243, 456, 464, 321

[56] References Cited

U.S. PATENT DOCUMENTS

| | | | |
|---|---|---|---|
| 2,498,024 | 2/1950 | Baxter | 426/637 X |
| 3,881,028 | 4/1975 | Capossela, Jr. et al. | 426/242 |
| 4,389,424 | 6/1983 | Hasegawa | 426/546 |
| 4,390,550 | 6/1983 | Kahn et al. | 426/102 |
| 4,447,459 | 5/1984 | Balboni et al. | 426/441 |
| 4,542,030 | 9/1985 | Haury et al. | 426/262 |
| 4,579,743 | 4/1986 | Hullah | 426/262 |
| 4,632,838 | 12/1986 | Doenges | 426/441 |
| 4,751,093 | 6/1988 | Hong et al. | 426/438 |
| 4,761,297 | 8/1988 | Sugisawa et al. | 426/618 |
| 5,059,435 | 10/1991 | Sloan et al. | 426/637 X |
| 5,084,291 | 1/1992 | Burrows et al. | 426/637 X |
| 5,302,410 | 4/1994 | Calder et al. | 426/438 X |

FOREIGN PATENT DOCUMENTS 2104370   2/1983   United Kingdom .................. 426/637

*Primary Examiner*—Arthur L. Corbin
*Attorney, Agent, or Firm*—Thomas R. Savoie; Thomas A. Marcoux

[57] ABSTRACT

Shelf-stable, intermediate-moisture potatoes are produced by blanching pieces of raw potatoes in a heated infusion solution containing glycerol and sodium chloride, draining and cooling the infused potato pieces and drying the infused potato pieces such that the pieces have a water activity of below 0.85%. In one embodiment, blanching is performed by soaking the pieces in an infusion solution from 1 to 3 minutes at a temperature of at least 200° F. (93.3° C.) where the solution contains at least 5% sodium chloride and at least 10% glycerol.

19 Claims, No Drawings

PROCESS FOR PREPARING SHELF-STABLE, INTERMEDIATE-MOISTURE POTATOES

BACKGROUND OF THE INVENTION

Field of the Invention

The present invention relates to the preparation of potatoes, and more specifically, the preparation of intermediate-moisture potatoes that may be stored on the shelf for extensive time periods without the need for refrigeration.

It is well known in the prior art that potatoes may be dehydrated, but extensive problems have resulted in producing a final product that has high quality from consumer considerations. Flavor loss from the processing steps has caused lower quality than is desired. Additionally, storage of the dehydrated product may necessitate specific conditions such as refrigeration, including freezing. Upon rehydration, non-uniform water absorption in the product may result which also lowers product quality.

A recent development in the food industry is the emphasis on intermediate-moisture foods which have the ability of being stored and marketed in a substantially non-refrigerated condition. These foods were designed to avoid the need to be packaged in a hermetically sealed container and commercially sterilized or maintained in a frozen or refrigerated state throughout the period of distribution and storage by the consumer.

The intermediate-moisture foods are based on the principle of reducing the availability of water in the food for microbial growth. The availability of water for germination and microbial growth is closely related to its relative vapor pressure, commonly designated as water activity. It was found that the use of a wide variety of water-soluble solutes, or osmotic agents, has the effect of depressing the water activity of the foods to levels at which most bacteria will not grow.

The water activity of a food is defined as the partial pressure of water in the food divided by the saturation pressure of water at the temperature of the food. The water activity can be determined by placing a sample in a container which is then sealed, and after equilibrium is reached, determining the relative humidity above the sample. Most intermediate-moisture products have between 10 to 40% moisture, and a water activity between 0.65 and 0.9.

DISCUSSION OF THE PRIOR ART

U.S. Pat. No. 4,390,550 is directed to intermediate-moisture foods that are frozen for long term preservation and which remain shelf-stable for a long period after thawing. The foods are prepared with a sugar/water ratio of 1:1 which reduces the water activity to between 0.75 to 0.93, preferably between 0.80 and 0.90. The sugar is employed as the principal source of water-soluble solutes in a range of 30% to 60% of the composition. Other non-sugar, water-soluble solutes may also be included with the sugar, such as sodium chloride, potassium chloride, glycerol, propylene glycol and the like. The method of making these foods include blending 15 to 45% water, sugar in a sugar/water ratio of 2-1:1, 2.5 to 30% fat and minor amounts of salt, emulsifier, stabilizer and flavoring, provided that the solubles are adequate to provide a water activity of 0.8 to 0.9, pasteurizing the mixture and cooling the resultant products. The pasteurizing is performed by heating and holding the mixture at 180° F. for 5 minutes. The mixture is then homogenized, packaged and frozen. In one example, fruit is added to the mixture. The fruit is first infused with sugar solutes to reduce its water activity to 0.45 to 0.65. Infusion is achieved by placing the fruit in a hot bath of fructose-containing syrup at about 220° F. to 225° F. for about 5 minutes. Although disclosed as being useful for many diverse foods, there is no disclosure of a process for making shelf-stable potatoes or other starch based foods.

U.S. Pat. No. 3,881,028 is directed to a method for preparing intermediate-moisture shelf-stable potatoes that includes preparing strips of potatoes, blanching the potatoes at about 212° F., thereafter soaking the blanched potatoes in a heated (180° F.) salt solution, such as a 1.5% sodium chloride, drying by microwave heating for 45 seconds, frying in oil at 350° F. for 6 minutes and drying in a microwave for 75 seconds. The shelf-stable potatoes are reconstituted by soaking in tap water at 140° F. for 10 minutes and then heated in an oven at 425° F. for 7 minutes. The salt dip is employed to remove surface starch to reduce non-uniformity caused by the blanching.

U.S. Pat. No. 4,751,093 discloses a process for preparing french fries for freezing that includes infusing low molecular weight, soluble solids, such as 2%–20% sodium chloride, simultaneously with blanching at about 200°–205° F. for 8 minutes, drying at up to 200° F., frying in oil at about 350° F. for 1 minute and freezing.

There is a need for a fast and simple process for preparing shelf-stable, intermediate-moisture potatoes without case hardening that when reconstituted and cooked have firm texture and excellent flavor.

SUMMARY OF THE INVENTION

The present invention is directed to a method for preparing shelf-stable intermediate-moisture potatoes suitable for reconstitution that includes first preparing pieces (e.g., slices) of raw potatoes for processing and then blanching the raw potato pieces in a heated infusion solution containing glycerol and sodium chloride to infuse glycerol and sodium chloride into the potato pieces. The pieces are then drained and cooled and thereafter dried resulting in potato pieces having a water activity of below 0.85. The blanching step includes soaking the raw potato pieces in the infusion solution for from 1 to 3 minutes at a temperature of at least 200° F. (93.3° C.). The infusion solution contains at least 5% sodium chloride and at least 10% glycerol. The pieces are dried by subjecting the pieces to heat for a sufficient time and temperature to reduce the water activity of the pieces to below 0.85. The pieces may then be packaged in moisture impermeable packaging material but no special packaging such as vacuum sealing or sterilization is required. In addition, no refrigeration or freezing is necessary.

In accordance with one aspect of the present invention, the ratio and amount of glycerol and sodium chloride is adjusted to reduce the water activity of the pieces to below 0.85 upon blanching. The drying step then further reduces the water activity well below 0.85.

The infusion solution may also contain sugars in the amount of up to 20% by weight. The sugar is selected from the group consisting of sucrose, dextrose, fructose and combinations thereof. In addition, prior to blanching, the pieces may optionally be soaked in a solution containing at least 0.1% sodium pyrophosphate to prevent browning.

The drying step may be performed in conventional ovens of various types, at a temperature of at least 200° F. (93.3° C.) for at least 1 minute. The pieces (e.g., strips or cubes) may be further dried by frying for at least two minutes at a temperature of at least 350° F. (176.7° C.) in oil. In the event frying is employed, a batter coating may be applied to the pieces prior to frying. Frying would typically be employed in the preparation of home fry or french fry potatoes.

The use of glycerol and sodium chloride in the heated infusion solution results in an accelerated infusion process producing shelf-stable intermediate-moisture potatoes that may be stored for long periods of time without the need for refrigeration or other storing means. When reconstituted, by conventional methods in water or sauces, and preferably by microwave heating, the potatoes have an excellent firm texture and flavor. The glycerol and sodium chloride combination penetrate the potatoes, lowering the water activity and leaving the potatoes resilient to case hardening during drying. Other known humectants that can also be included together with the glycerol and sodium chloride combination include propylene glycol, potassium chloride, sodium nitrite, potassium sorbate, sorbitol and propylparabin. These additional humectants, if present, would each typically be contained in the solution at the level of at least 0.1%.

In addition, the process of the present invention can also be used to produce other intermediate-moisture, shelf-stable, starch products such as rice or pasta.

All percents and ratios recited in the descriptions and claims of this invention are given on a weight basis.

DETAILED DESCRIPTION OF THE INVENTION

The present invention is directed to a method of preparing shelf-stable intermediate-moisture potatoes that may be stored without the need for refrigeration or other means for long periods of time. The process of the present invention provides for an accelerated infusion of potatoes or other starch based products using aqueous solutions containing glycerol and sodium chloride at elevated temperatures. The invention allows the potatoes to be continuously processed from a raw or uncooked state to a shelf-stable form in a very short time, i.e., in as little as 20–50 minutes, preferably 20–30 minutes.

The present invention produces a flexible intermediate-moisture potato without case hardening. Case hardening is a common problem encountered when drying starch-based products and is normally overcome by drying at lower temperatures with high humidity for long periods of time. The accelerated infusion process of the present invention permits the potatoes to be dried quickly at higher temperatures using various drying methods to produce potatoes that when reconstituted have an excellent firm texture and flavor. The intermediate-moisture potatoes of the present invention may be stored without the need for refrigeration and do not need any special wrapping materials although a moisture impermeable packaging is desired for extensive storage times to prevent water absorption from the atmosphere. The intermediate-moisture potatoes of the present invention may be reconstituted by placing the potatoes in water or sauces and microwave heating. Reconstitution in a liquid, such as water or a water-based sauce, is preferred in order to leach out glycerol which may, depending on the amount, cause a slight off-flavor in the potato. The presence of glycerol in a sauce may, if desired, be masked by conventional flavoring agents.

In accordance with the process of the present invention, whole potatoes are preferably peeled, washed and cut into pieces of the desired shape, such as, for example, scalloped potatoes, french fries or home fries. The raw potatoes are then blanched in an infusion solution containing glycerol and sodium chloride. The infused potato pieces are drained and cooled and then dried resulting in an intermediate-moisture, shelf-stable potato having a water activity of below 0.85. The infusion solution may contain various ratios of glycerol and sodium chloride. In addition, the drying step is performed at various times and temperatures. These variables are adjusted such that the resultant infused and dried potato pieces have a water activity of below 0.85. The ratio of glycerol to sodium chloride in the infusion solution of the present invention is in the range of 7.5:1 to 1:1. Preferably, the ratio of glycerol to sodium chloride is about 2:1. In a preferred embodiment of the present invention, the infusion solution contains at least 5% sodium chloride. Additionally, it is also preferred that the infusion solution contain at least 10% glycerol. Moreover, the range of sodium chloride is typically from 5% to 8% and the range of glycerol is from 10% to 15%.

The infusion solution of the present invention can be composed of the various ratios of glycerol and sodium chloride alone or in combination with other known humectants such as propylene glycol, potassium chloride, sodium nitrite, potassium sorbate, sorbitol and propylparabin. These additional humectants may each be included at the level of at least 0.1% of the infusion solution. Further, the infusion solution may also contain a sugar selected from the group consisting of sucrose, dextrose fructose and combinations thereof. One factor in the selection and level of the sugar will be the desirability for sweetness in the resulting potatoes.

Prior to blanching, the potatoes may be treated to prevent browning such as by soaking the raw strips in a solution containing at least 0.1% sodium pyrophosphate. Alternatively, the sodium pyrophosphate may be included in the infusion solution.

The blanching step is performed for at least one minute at a temperature of least 200° F. (93.3° C.). Preferably, the blanching is performed from between 1 to 3 minutes at about 212° F. (100° C.).

After the infused potato pieces are drained and cooled, the pieces may be dried by conventional means such as in an oven. As is well known, in an oven the potato pieces will be subjected to heated air by methods such as impingement, humidified or high velocity convection. The oven drying is performed for at least 1 minute at a temperature of at least a 200° F. (93.3° C.). Alternatively, the drying may be effected by a combination of oven drying and frying wherein the infused potato pieces will be heated in the oven for at least 1 minute at a temperature of at least 200° F. (93.3° C.) and thereafter fried for at least 2 minutes at a temperature of at least 350° F. (176.7°). A batter coating may also be applied to the potato pieces prior to frying in oil.

An unexpected result from the present invention is that although the water activity of the infusion solution is above 0.90, typically ranging from 0.90 to 0.925, the longer the potatoes were cooked in the infusion solution, the lower the resulting water activity. For example, sliced potatoes were blanched in an infusion solution containing 75% water, 15% glycerol and 10% sodium chloride, at a temperature of 212° F. (100° C.) for nine minutes. The water activity (Aw) of the potatoes was reduced as shown in Table 1.

TABLE 1

| Aw | Time (min.) |
|---|---|
| 1.0 | 0 |

TABLE 1-continued

| Aw    | Time (min.) |
|-------|-------------|
| 0.93  | 2           |
| 0.91  | 3–4         |
| 0.88  | 5–6         |
| 0.86  | 7–8         |
| 0.818 | 9           |

The above example shows that, by itself, the infusion solution of the present invention can reduce the water activity below 0.85, the threshold at which the water activity of the potatoes must be below in order for the potatoes to be shelf-stable. In this case, the additional drying significantly further reduces water activity to greatly enhance the time during which the potatoes remain shelf-stable. The nine minute blanching time resulted, however, in a very high salt flavor. The high salt flavor of the potatoes may be reduced by appropriate seasonings contained in a sauce used during reconstitution of the potatoes or in a batter coating applied to the potatoes prior to frying in oil. It is most preferred, however, that the blanching in the infusion solution be conducted for one to two minutes in order to reduce the water activity of the potatoes to about 0.94. The potatoes are then dried for a sufficient time and temperature to reduce the water activity to below 0.85. In the example described above, after blanching, the potatoes were dried for 15 minutes in an impingement oven at 200° F. (93.3° C.) which resulted in reducing the water activity to 0.83.

To further illustrate the innovative aspects of the present invention, the following examples are provided:

EXAMPLE 1

| Infusion Solution | Quantity | Percent |
|-------------------|----------|---------|
| Water             | 1,875 g  | 75.0    |
| Glycerol          | 375 g    | 15.0    |
| Sodium Chloride   | 250 g    | 10.0    |
| TOTAL             | 2,500 g  | 100.0   |

PROCESS: Russet potatoes were washed, peeled, and sliced on a Hobart® meat slicer at setting #10 (0.287 cm) for scalloped potatoes. 250 Grams of the sliced potatoes were blanched in 2500 g of the above infusion solution at 100° C., for 90 seconds. The potatoes were removed, placed on a perforated tray and chilled in a refrigerator (10° F.) for 3 minutes. The chilled potatoes were dried using three different methods:

| Method | Temp. °C. | Time | Water Activity (Aw) |
|--------|-----------|------|---------------------|
| Impingement Oven | 93.3 | 15 min. | .838 |
| Impingement Oven | 93.3 | 20 min. | .610 |
| Blue M ® Humidity Oven | (118 wet bulb 51.7 dry bulb) | 17 hrs. 24 hrs. | .842 .826 |
| Vulcan ® Conventional Oven | 93.3 | 20 min. 30 min. | .858 .817 |
| Hobart ® High Velocity Oven | 93.3 | 30 min. | .544 |

The dried potato slices were rehydrated and evaluated using two methods—microwaved in water or in a cheese sauce.

WATER RECIPE: 50 grams of dried potatoes were placed in a cup of water (240 ml) and heated in a microwave for 90 seconds, the result was a cooked potato with firm texture and good flavor which was not too salty.

SAUCE RECIPE: 50 grams of dried potatoes were placed in 266 g of cheese sauce (26 grams of powdered cheese sauce +240 ml of water). The product was heated in a microwave oven for 3 minutes, the result was a cooked potato with excellent texture, and a not too salty flavor. Flavor adjustments can be made by using different sauces.

EXAMPLE 2

| Infusion Solution | Quantity | Percent |
|-------------------|----------|---------|
| Water             | 2,115 g  | 84.8    |
| Glycerol          | 250 g    | 10.0    |
| Sodium Chloride   | 125 g    | 5.0     |
| Sodium Pyrophosphate | 5 g   | 0.2     |
| TOTAL             | 2,500 g  | 100.0   |

PROCESS: Russet potatoes were washed, peeled, and cut into 0.635 cm, shoestring french fry potato strips. These potatoes were soaked in an aqueous solution containing 0.2% sodium pyrophosphate, to retard browning. 250 Grams of the raw french fry potatoes were blanched in 2500 ml of the above infusion solution at 100° C., for 2 minutes. The potatoes were removed, placed on a perforated tray and chilled in a refrigerator (10° C.) for 3 minutes. The potatoes were then dried for 75–90 minutes at 93.3° C. in a conventional oven (to an Aw 0.818–0.867). These potatoes were then fried for 2 minutes in 375° F. oil.

Crispiness was enhanced by applying the following batter formula prior to frying. When the batter coating is applied, the fry time is reduced to 90 seconds.

| Batter Coating Formula | | |
|---|---|---|
| | Usage | Percent |
| Rice flour | 30.0 g | 40.0 |
| 36 DE Dextrin | 10.0 g | 13.0 |
| Water | 36.0 g | 47.0 |
| | 76.0 g | 100.0 |

The resulting water activity ranges from 0.491 to 0.678 without the batter coating and from 0.676 to 0.711 with the coating applied. In all cases the finished products are shelf-stable.

While this invention has been described by reference to the specific operating examples, it is intended to be limited only by the scope of the appended claims.

What is claimed is:

1. A method for preparing shelf-stable, intermediate-moisture potatoes suitable for reconstitution comprising:

(a) preparing pieces of raw potatoes;

(b) blanching the raw potato pieces in an infusion solution containing glycerol and sodium chloride to infuse glycerol and sodium chloride into said potato pieces;

(c) draining and cooling the infused potato pieces; and (d) drying the infused potato pieces, the resultant infused and dried potato pieces having a water activity of below 0.85.

2. The method of claim 1, wherein said infusion solution contain at least 5% by weight of sodium chloride.

3. The method of claim 1, wherein said infusion solution contains at least 10% by weight of glycerol.

4. The method of claim 1, wherein said infusion solution contains sodium chloride in a range of about 5% to 8% by weight.

5. The method of claim 1, wherein said infusion solution contains glycerol in a range of about 10% to 15% by weight.

6. The method of claim 1, wherein said infusion solution contains a weight ratio of glycerol to sodium chloride in a range of 1:1 to 7.5:1.

7. The method of claim 6, wherein said weight ratio of glycerol to sodium chloride is about 2:1.

8. The method of claim 1, wherein said blanching step is performed for at least 1 minute at a temperature of at least 200° F.

9. The method of claim 8, wherein said blanching step is performed for 1 minute to 3 minutes.

10. The method of claim 1, wherein said drying step is performed in an oven at a temperature of at least 200° F. for at least 1 minute.

11. The method of claim 1, wherein said drying step includes heating said infused potato pieces in an oven for at least 1 minute at a temperature of at least 200° F. and thereafter frying said infused potato pieces for at least 2 minutes at a temperature of at least 350° F.

12. A method for preparing shelf-stable, intermediate-moisture potatoes suitable for reconstitution comprising the steps of:

(a) preparing pieces of raw potatoes;

(b) soaking the raw potato pieces in an infusion solution for 1 to 3 minutes at a temperature of at least 200° F., the infusion solution containing at least 5% by weight of sodium chloride and at least 10% by weight of glycerol to infuse glycerol and sodium chloride into said potato pieces;

(c) draining and cooling the infused potato pieces;

(d) drying the infused potato pieces by subjecting the pieces to heat for a time and at a temperature sufficient to reduce the water activity of the pieces to below 0.85; and (e) packaging the dried pieces in moisture impermeable packaging material.

13. The method of claim 12, wherein said infusion solution contains a weight ratio of glycerol to sodium chloride in a range of 1:1 to 7.5:1.

14. The method of claim 13, wherein said drying step is performed in an oven at a temperature of at least 200° F. for at least 1 minute.

15. The method for preparing and reconstituting shelf-stable, intermediate-moisture potatoes comprising the steps of:

(a) preparing pieces of raw potatoes;

(b) blanching the raw potato pieces in an infusion solution containing at least 10% by weight of glycerol and at least 5% by weight of sodium chloride to infuse glycerol and sodium chloride into said potato pieces, the temperature of the infusion solution being at least about 200° F.;

(c) draining and cooling the infused potato pieces;

(d) drying the infused potato pieces in an oven, the resultant infused and dried potato pieces having a water activity of below 0.85%;

(e) combining the infused and dried potato pieces with a reconstitution liquid selected from the group consisting of water and water-based sauces; and (f) heating the combination of step (e) in an oven.

16. The method of claim 15 wherein the oven in step (d) is a microwave oven.

17. The method of claim 15 wherein the infusion solution contains a weight ratio of glycerol to sodium chloride in the range of 1:1 to 7.5:1.

18. The method of claim 15 wherein said blanching step is performed for 1 to 3 minutes.

19. The method of claim 15 wherein said drying step is performed in an oven having a temperature of at least about 200° F.

* * * * *